United States Patent [19]

Curry

[11] Patent Number: 5,706,099
[45] Date of Patent: Jan. 6, 1998

[54] METHOD AND APPARATUS FOR GENERATING SERPENTINE HALFTONE IMAGES

[75] Inventor: Douglas N. Curry, Menlo Park, Calif.

[73] Assignee: Xerox Corporation, Stamford, Conn.

[21] Appl. No.: 463,178

[22] Filed: Jun. 5, 1995

[51] Int. Cl.[6] .................................................. H04N 1/21
[52] U.S. Cl. ........................ 358/298; 358/459; 358/456
[58] Field of Search .................................. 358/298, 534, 358/535, 536, 459, 456, 457, 458; 355/201; 283/72, 93; 382/135, 137

[56] References Cited

U.S. PATENT DOCUMENTS

| | | | |
|---|---|---|---|
| 4,680,645 | 7/1987 | Dispoto et al. | 358/298 |
| 4,692,603 | 9/1987 | Brass et al. | 235/454 |
| 4,727,430 | 2/1988 | Miwa | 358/298 |
| 4,728,783 | 3/1988 | Brass et al. | 235/456 |
| 4,754,127 | 6/1988 | Brass et al. | 235/456 |
| 4,782,221 | 11/1988 | Brass et al. | 235/494 |
| 5,091,966 | 2/1992 | Bloomberg et al. | 382/21 |
| 5,239,391 | 8/1993 | Hamilton | 358/459 |
| 5,315,098 | 5/1994 | Tow | 235/494 |
| 5,337,361 | 8/1994 | Wang et al. | 380/51 |
| 5,410,414 | 4/1995 | Curry | 346/108 |
| 5,537,223 | 7/1996 | Curry | 358/460 |
| 5,579,457 | 11/1996 | Hall | 395/132 |
| 5,583,660 | 12/1996 | Rylander | 358/456 |

*Primary Examiner*—Peter S. Wong
*Assistant Examiner*—Derek J. Jardieu
*Attorney, Agent, or Firm*—Oliff & Berridge

[57] ABSTRACT

An apparatus and method for producing a halftone image which generates halftone cells based on grayscale image data values. Each of the halftone cells is formed from serpentine dot patterns. The serpentine dot patterns form two separate arcs. The halftone cells are written onto a recording medium to produce the halftone image. Rotation of the halftone cells allows data to be encoded within each of the halftone cells without varying the tone of the image. The tone of the image may be controlled by selectively varying a thickness of the arcs within the halftone

20 Claims, 3 Drawing Sheets

1

METHOD AND APPARATUS FOR GENERATING SERPENTINE HALFTONE IMAGES

FIELD OF THE INVENTION

The present invention relates to devices and methods for producing halftone images, and, more particularly, to devices and methods for producing such halftone images from halftone cells which include serpentine dot patterns.

BACKGROUND OF THE INVENTION

Halftoning is a well-known and widely utilized technique for imparting a grayscale appearance to dual tone renderings of variably shaded monochromatic images (e.g., black and white images) and to dual tone color separations of variably shaded polychromatic images. It originated as an optical analog process for imparting a grayscale appearance to dual tone reproductions of continuous tone monochromatic images, but it since has been extended to provide digital halftoning processes that can be utilized by digital document processors for imparting a grayscale appearance to dual tone representations of variably shaded, scanned-in digitized images and to dual tone representations of variably shaded, computer generated synthetic images. These digitally defined images may be monochromatic or polychromatic, so it is to be understood that digital halftoning can be applied for imparting a grayscale appearance to printed and displayed renderings of monochromatic and polychromatic images.

The functional utility of plain paper and other types of hardcopy documents can be enhanced significantly if the human readable information that they normally convey is supplemented by adding appropriate machine readable digital data to them. Input scanners can be employed for recovering this machine readable data, so the data can be employed for various purposes during the electronic processing of such documents and their human readable contents by electronic document processing systems, such as electronic copiers, text and graphic image processing systems, facsimile systems, electronic mail systems, electronic file systems, and document and character recognition equipment.

As is known, machine readable digital data can be recorded by writing two dimensional marks on a recording medium in accordance with a pattern which encodes the data either by the presence or absence of marks at a sequence of spatial locations or by the presence or absence of mark related transitions at such locations. The bar-like codes which others have proposed for recording digital data on paper utilize that type of encoding. See U.S. Pat. No. 4,692,603 entitled "Optical Reader for Printed Bit-Encoded Data and Method of Reading Same," U.S. Pat. No. 4,728,783 and U.S. Pat. No. 4,754,127 on "Method and Apparatus for Transforming Digitally Encoded Data into Printed Data Strips," and U.S. Pat. No. 4,782,221 on "Printed Data Strip Including Bit-Encoded Information and Scanner Contrast." Another interesting approach is to encode machine readable digital data in the shapes of the marks of "glyphs" that are written on the recording medium.

Such shape codes are disclosed in U.S. Pat. No. 5,091,966 to Bloomberg et al., the disclosure of which is incorporated herein by reference.

Glyph shape codes have the advantage that they can be designed to have a relatively uniform appearance. For instance, a simple glyph shape code suitably is composed of small slash-like marks that are tilted to the right or left at,

2 say, ±45 degrees for encoding 1's and 0's, respectively. However, in some situations the more or less uniformly gray appearance of such a code may be aesthetically objectionable, and may cause the tone of the image to change upon tilting of the glyph codes.

A system and method for encoding digital data in halftone images is disclosed in U.S. Pat. No. 5,315,098 to Tow, the disclosure of which is incorporated herein by reference in its entirety. In Tow, digital data are encoded in the angular orientation of circularly asymmetric halftone dot patterns that are written into the halftone cells of digital halftone images. The sizes of the halftone dot patterns are modulated in accordance with grayscale data sample values that are provided to define the image. The patterns are modulated so that the average reflectance or transmittance of each of the halftone cells is modulated to provide a more or less standard halftone rendering of the image. By modulating the angular orientation of the halftone dot patterns, digital data is encoded within the halftone image. The digital data can then be read by a machine, as discussed above. However, the modulation of the angular orientation of the halftone dot patterns may disadvantageously affect the tone of the image depending upon the encoded values, which is an undesirable result.

Accordingly, there is a need for a less obtrusive code that will not affect the tone of the image upon rotation and will still allow data to be encoded within the halftone image.

SUMMARY OF THE INVENTION

To solve these and other problems, this invention provides an apparatus and method for generating a halftone image formed from halftone cells. The halftone cells are generated based on grayscale image data values, each of the halftone cells being formed from serpentine dot patterns forming two separate arcs. The halftone cells are written onto a recording medium to produce a halftone image.

This invention also provides such an apparatus and method for producing a halftone image by generating halftone cells each having serpentine dot patterns forming two separate arcs, the end portion of each of the arcs contacting end portions of arcs of an adjacent halftone cell within the image.

The invention further provides a method and apparatus for producing a halftone image by selectively varying a thickness of the arcs within the individual halftone cells which make up the image to vary a tone of the image. Additionally, the invention provides for encoding data within each of the halftone cells. The data may be encoded by rotating the halftone cells. The rotational position of the halftone cells does not affect a tone of the overall image. Additionally, the encoded data is machine readable.

The present invention provides these and other features in an apparatus for producing a halftone image, the apparatus including a halftone generator for generating halftone cells based on grayscale image data values, each of the halftone cells having serpentine dot patterns forming two separate arcs. An output device writes the halftone cells on a recording medium to produce the halftone image. The halftone generator varies the tone of the image by selectively varying a thickness of the arcs (formed by serpentine dot patterns) within individual halftone cells. Data may be encoded within the halftone cells by rotating the halftone cells based on encoding data input to the halftone generator. Rotation of the halftone cells does not affect the tone of the image.

BRIEF DESCRIPTION OF THE DRAWINGS

The invention will be described with reference to the following drawings in which like references numerals refer to like elements and wherein.

DETAILED DESCRIPTION OF PREFERRED EMBODIMENTS

Figure 1:
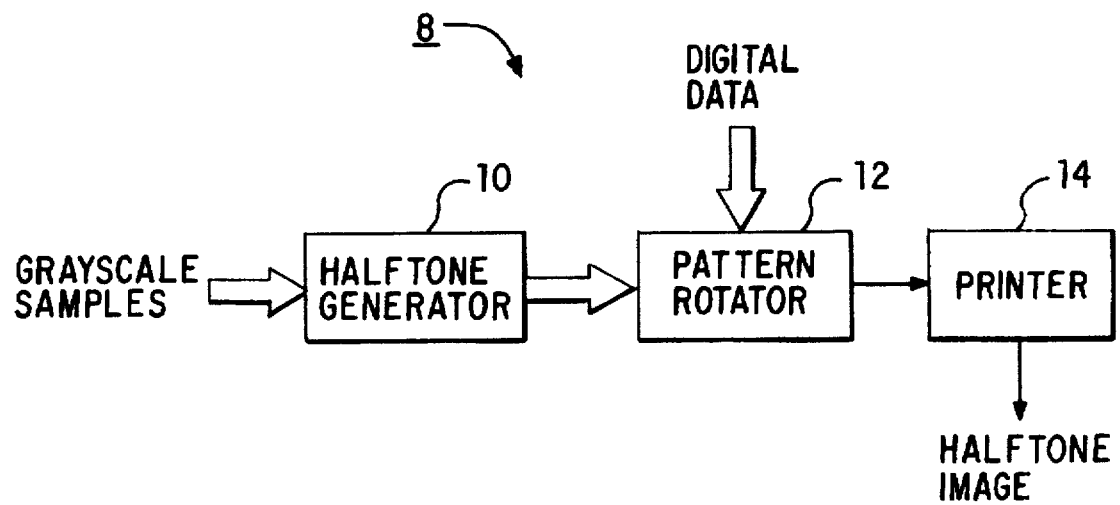
FIG. 1 is a schematic view of an image generating system according to the present invention.

FIG. 1 illustrates an image generation system 8 for producing halftone images according to the present invention. The image generation system 8 includes a halftone generator 10, a pattern rotator 12 and a printer 14.

The halftone generator 10 generates halftone cells based on grayscale samples (grayscale image data values) which are generated by a device capable of outputting image data, such as a scanner or a computer. The halftone cells are then fed to pattern rotator 12. The pattern rotator 12 selectively rotates individual ones of the halftone cells based upon digital data input to the pattern rotator, as shown in FIG. 1. The digital data is data used to encode machine-readable information within the halftone image. The pattern rotator 12 may be included within the halftone generator 10. The halftone cells encoded with data are then fed to printer 14, which generates a halftone image based upon the halftone cells.

The halftone image generating system 8 produces halftone images of, for example, scanned in or computer generated synthetic grayscale images. The halftone generator 10 transforms spatially periodic grayscale input image sample values into halftone dot patterns. In keeping with standard practices, these dot patterns are written into a spatially periodic, two-dimensional array of halftone cells. The halftone generator 10 may have a table look-up memory (not shown) that is addressed by the grayscale image sample values to retrieve halftone cells that are preprogrammed to contain appropriate dot patterns.

Figure 2:
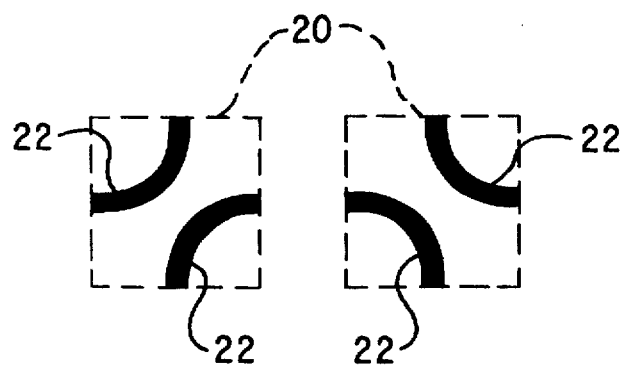
FIG. 2 is a view illustrating individual halftone cells according to a preferred embodiment of the present invention.

Each of the halftone cells is composed of a two-dimensional array of pixels. For example, FIG. 2 illustrates halftone cells 20 produced according to the present invention. Each of the halftone cells 20 is formed from serpentine dot patterns forming two separate arcs 22. The halftone cells 20 are generally square shaped but may be formed of different, symmetric shapes such as hexagons. Each of the two arcs 22 within a halftone cell 20 intersect two adjacent sides of the halftone cell 20 at approximately a center portion of each. The halftone cells 20 shown in FIG. 2 are shown rotated 90 degrees from one another. The rotation of the halftone cells 20 is used to encode data within each of the cells, as will be further explained below. Each of the halftone cells 20 is relatively small. For example, each of the halftone cells 20 in actual use may have a size of approximately 1/75"×1/75".

A halftone image is formed according to the present invention by placing a large number of the halftone cells 20 adjacent to one another. A tone of the image is controlled by selectively varying a thickness of the arcs 22 within the halftone cells 20. Rotation of the halftone cells 20 does not vary a tone of the image because the arcs of one cell will connect with the arcs of an adjacent cell regardless of how one cell is rotated relative to the adjacent cell. Thus the halftone cells 20 may be encoded with data without varying the tone of the image.

The halftone cells 20 produced according to the present invention are encoded according to their rotational position as a "0" or "1". For example, the rotational position of the left most halftone cell 20 shown in FIG. 2 may indicate an encoded "1" value while the rotational position of the right most halftone cell 20 shown in FIG. 2 may indicate a "0" encoded value.

Figure 3:
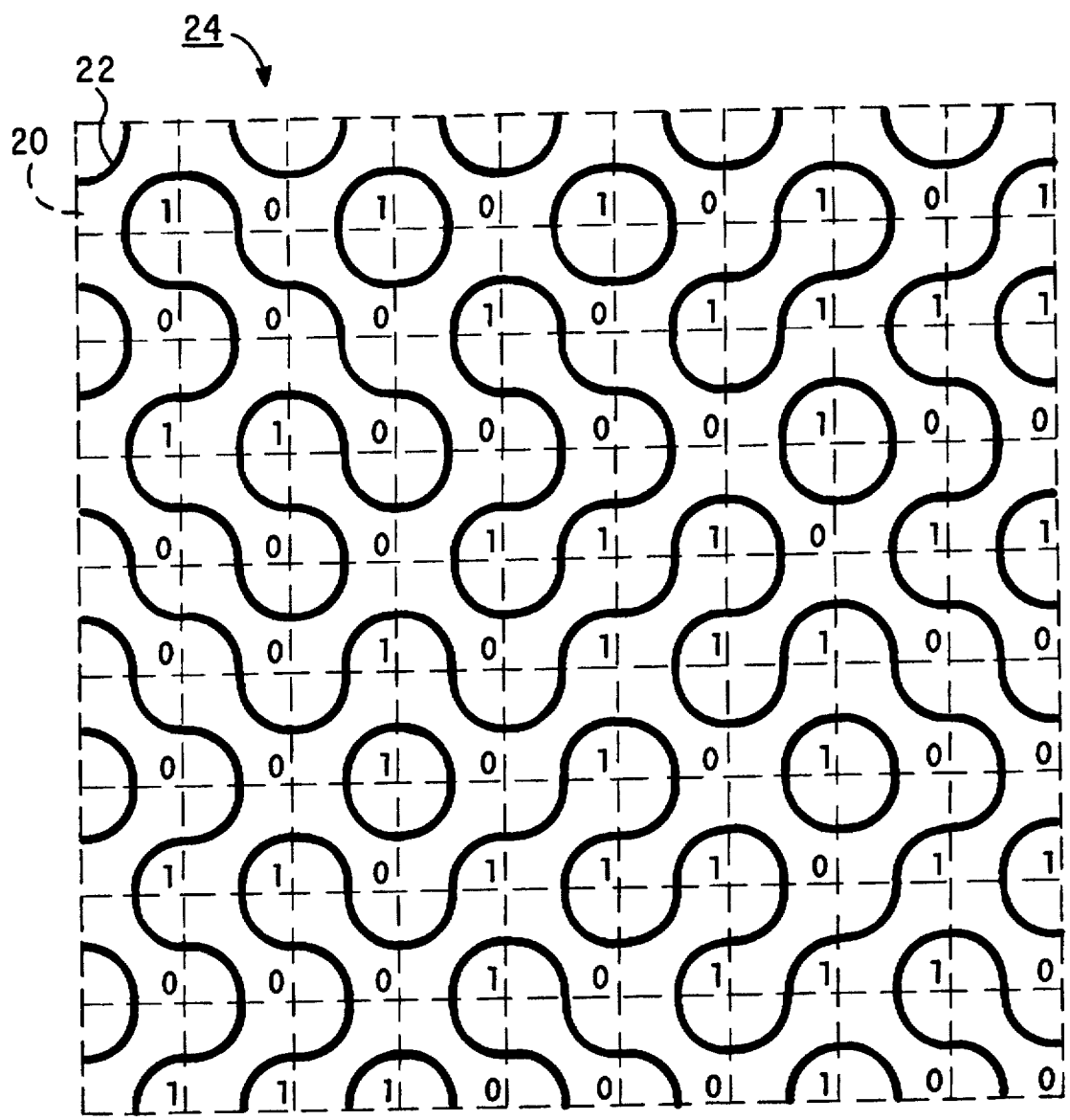
FIG. 3 is an enlarged view of a halftone image produced according to preferred embodiment of the present invention.

FIG. 3 illustrates an enlarged view of a halftone image 24 generated in accordance with the present invention. The halftone cells 20 of the halftone image 24 include the arcs 22 formed from serpentine dot patterns. As previously described, each of the arcs 22 intersects a center portion of the halftone cell 20 within which the arcs 22 are formed. The halftone cells 20 are arranged adjacent to one another to form halftone image 24. An end portion of the arcs 22 within the halftone cells 20 contacts an end portion of an arc on an adjacent halftone cell so that the end portions of the arcs of each halftone cell 20 always contact the end portions of arcs of neighboring halftone cells 20 at a center portion of the sides of the halftone cells 20. Since the halftone cells 20 are identical near boundaries of the halftone cells, there is no discernable change in tone after 90° rotation of individual ones of the halftone cells.

As previously indicated, a tone of the image is adjusted in accordance with the present invention by selectively varying a width of the arcs 22 within the halftone cells 20.

Each of the halftone cells 20 shown in FIG. 3 is illustrated with a "1" or "0" shown in the lower righthand corner of the halftone cell 20. The "1" or "0" are shown for illustration purposes only in FIG. 3 and represent an encoded data value of each of the halftone cells 20. As explained above, the encoded data value is based on rotation of the halftone cells relative to one another. The encoded data is typically read by a machine. Devices such as input scanners can be employed for recovering machine readable encoded data from the image. The encoded data can be employed for various purposes during electronic processing of such documents by electronic document processing systems, such as electronic copiers, text and graphic image processing systems, facsimile systems, electronic mail systems, electronic file systems and document and character recognition equipment.

Figure 4:
FIG. 4 illustrates a halftone image produced according to a preferred embodiment of the present invention.

FIG. 4 illustrates a halftone image 26 produced according to a preferred embodiment of the present invention. The halftone image 26 is formed from halftone cells 20. Each of the halftone cells 20 includes two separate arcs 22 formed from serpentine dot patterns, as shown in FIGS. 2 and 3.

As explained above, the tone of various portions of the image 26 is selectively varied by varying a thickness of the arcs 22 within individual halftone cells 20. Further, the image 26 includes halftone cells 20 that are encoded with data by selective rotation of the halftone cells 20. Further, the image 26 includes halftone cells 20 that are encoded with data by selective rotation of the halftone cells 20. The encoded data can be read by a machine such as a scanner or other device equipped for decoding.

The halftone image 26 was produced with 75 halftone cells 20 per inch. Due to the relatively small size of the halftone cells, the encoded data may be lost in a copy of image 26 if the machine used to make the copy does not have sufficient resolution.

While this invention has been described in conjunction with a specific embodiments thereof, it is evident that many alternatives, modifications and variations will be apparent to those skilled in the art. Accordingly, the preferred embodiments of this invention, as set forth herein, are intended to be illustrative and not limiting. Various changes may be made without departing from the spirit and scope of the invention as defined in the following claims.

What is claimed is:

1. An apparatus for producing a halftone image, comprising:
   a halftone generator for generating halftone cells based on grayscale image data values, each of the halftone cells comprising serpentine dot patterns forming at least two separate arcs; and
   an output device for writing the halftone cells on a recording medium to produce the halftone image, wherein each of the halftone cells has four sides, each of the two arcs having two end portions, each of the end portions intersecting a center portion of one of the four sides.

2. The apparatus of claim 1, wherein a tone of the halftone image is independent of rotation of one halftone cell relative to adjacent halftone cells.

3. The apparatus of claim 1, wherein each of the halftone cells has four sides, each of the arcs has two end portions and each of the end portions contacts end portions of the arcs of an adjacent one of the halftone cells at a center portion of the sides.

4. The apparatus of claim 1, wherein the halftone generator varies a tone of the image by selectively varying a thickness of the arcs within individual ones of the halftone cells.

5. The apparatus of claim 1, further comprising encoding means for encoding data within each of the halftone cells.

6. The apparatus of claim 1, wherein the halftone image is a polychromatic halftone image.

7. The apparatus of claim 5, wherein the encoding means comprises a pattern rotating device for rotating the halftone cells based on encoding data.

8. The apparatus of claim 5, wherein the halftone image is a polychromatic halftone image.

9. The apparatus of claim 7, wherein a rotational position of each of the halftone cells determines an encoded data value.

10. The apparatus of claim 9, wherein the rotational position of the halftone cells does not affect a tone of the image.

11. A method of producing a halftone image, comprising:
    generating halftone cells based on grayscale image data values, each of the halftone cells comprising serpentine dot patterns forming at least two separate arcs; and
    writing the halftone cells on a recording medium to produce the halftone image, wherein each of the halftone cells has four sides, each of the two arcs having two end portions, each of the end portions intersecting a center portion of one of the four sides.

12. The method of claim 11 comprising rotating one halftone cell relative to adjacent halftone cells without affecting a tone of the halftone image.

13. The method of claim 11, wherein each of the end portions contacts end portions of the arcs of an adjacent one of the halftone cells at a center portion of the sides.

14. The method of claim 11, further comprising varying a tone of the image by selectively varying a thickness of the arcs within individual ones of the halftone cells.

15. The method of claim 11, further comprising encoding data within each of the halftone cells.

16. The method of claim 11, wherein the halftone image is a polychromatic halftone image.

17. The method of claim 15, wherein encoding data within each of the halftone cells comprises rotating the halftone cells based on encoding data.

18. The method of claim 15, wherein a rotational position of each of the halftone cells determines an encoded data value.

19. The method of claim 15, wherein the halftone image is a polychromatic halftone image.

20. The method of claim 18, wherein the rotational position of the halftone cells does not affect a tone of the image.

* * * * *